US012810829B2

(12) United States Patent
Vitaletti et al.

(10) Patent No.: US 12,810,829 B2
(45) Date of Patent: Nov. 24, 2026

(54) SYSTEM FOR CONVERTING IMAGES INTO SOUND SPECTRUM

(71) Applicant: Andrea Vitaletti, Sabaudia (IT)

(72) Inventors: Andrea Vitaletti, Sabaudia (IT); Augusto Grenga, Priverno (IT)

(73) Assignee: Andrea Vitaletti, Sabaudia (IT)

( * ) Notice: Subject to any disclaimer, the term of this patent is extended or adjusted under 35 U.S.C. 154(b) by 961 days.

(21) Appl. No.: 18/020,348

(22) PCT Filed: Sep. 23, 2021

(86) PCT No.: PCT/IB2021/058685
§ 371 (c)(1),
(2) Date: Feb. 8, 2023

(87) PCT Pub. No.: WO2022/064416
PCT Pub. Date: Mar. 31, 2022

(65) Prior Publication Data
US 2023/0306937 A1 Sep. 28, 2023

(30) Foreign Application Priority Data
Sep. 23, 2020 (IT) ........................ 102020000022453

(51) Int. Cl.

| | |
|---|---|
| ***G10H 1/06*** | (2006.01) |
| ***H04N 23/667*** | (2023.01) |
| ***H04N 23/959*** | (2023.01) |

(52) U.S. Cl.
CPC ............. *G10H 1/06* (2013.01); *H04N 23/667* (2023.01); *H04N 23/959* (2023.01); *G10H 2220/455* (2013.01)

(58) Field of Classification Search
CPC .. G10H 1/06; G10H 2220/455; H04N 23/959; H04N 23/667
(Continued)

(56) References Cited

U.S. PATENT DOCUMENTS 6,747,764 B1 * 6/2004 Chu ..................... H04N 1/0283 358/474
7,525,034 B2 * 4/2009 Nease ....................... G06T 7/00 84/626
(Continued)

FOREIGN PATENT DOCUMENTS

EP 2 323 368 5/2011
EP 2323368 A1 * 5/2011 ......... H04N 1/02885
(Continued)

OTHER PUBLICATIONS

International Search Report and Written Opinion of the ISA for PCT/IB2021/058685, mailed Jan. 5, 2022, 14 pages.
(Continued)

*Primary Examiner* — Christina M Schreiber
(74) *Attorney, Agent, or Firm* — NIXON & VANDERHYE

(57) ABSTRACT

Disclosed is a system for the real-time acquisition, analysis, and conversion of the visual spectrum of shapes, images, colors, and signs into sound spectrum, which is usable in various communicative contexts, such as in the field of interactive videogames, computer science, neuroscience and neuroimaging in the medical field, visual arts, social arts, but also in the pedagogical field, characterized in that it includes a hardware component for the analog optical acquisition of the still or dynamic images present on a transparent flat surface of the hardware component, and a software component for processing the acquired images and converting their visual spectrum into sound spectrum.

13 Claims, 4 Drawing Sheets

(58) Field of Classification Search
USPC .............................................................. 84/622
See application file for complete search history.

(56) References Cited

U.S. PATENT DOCUMENTS

| | | | | |
|---|---|---|---|---|
| 7,692,086 | B2 * | 4/2010 | Nease | G10H 1/0025 84/622 |
| 10,515,615 | B2 * | 12/2019 | Elkins | G10H 1/0025 |
| 10,755,683 | B1 * | 8/2020 | Baltazor | G10H 1/368 |
| 10,818,308 | B1 * | 10/2020 | Chu | G10L 15/26 |
| 12,380,659 | B1 * | 8/2025 | Kirk | G06T 19/006 |
| 2005/0007776 | A1 * | 1/2005 | Monk | G03H 1/2286 362/295 |
| 2009/0021798 | A1 * | 1/2009 | Abahri | H04N 1/195 358/474 |
| 2012/0174737 | A1 * | 7/2012 | Risan | G10H 7/02 84/622 |
| 2016/0247495 | A1 * | 8/2016 | Dourmashkin | G10H 1/34 |
| 2016/0277863 | A1 * | 9/2016 | Cahill | G01S 3/8083 |
| 2017/0358284 | A1 * | 12/2017 | Miki | G11B 27/031 |
| 2018/0144508 | A1 * | 5/2018 | Hu | G06T 11/00 |
| 2023/0139626 | A1 * | 5/2023 | Berliner | G06F 3/011 345/156 |
| 2023/0260489 | A1 * | 8/2023 | Bornfreedom | G10H 1/0008 84/622 |
| 2023/0306937 | A1 * | 9/2023 | Vitaletti | G03B 15/07 |

FOREIGN PATENT DOCUMENTS

| | | | | |
|---|---|---|---|---|
| JP | 08223377 | | 8/1996 | |
| JP | H08223377 | A * | 8/1996 | |
| WO | WO-2007071025 | A1 * | 6/2007 | A63F 13/814 |
| WO | 2007/105927 | | 9/2007 | |
| WO | WO-2007105927 | A1 * | 9/2007 | G10H 1/0553 |
| WO | WO-2017031421 | A1 * | 2/2017 | G10H 1/0025 |

OTHER PUBLICATIONS

Lui Simon, "Generate expressive music from picture with a hand-made multi-touch music table" Proceedings of the International Conference on New Interfaces for Musical Expression, Jun. 3, 2015 (Jun. 3, 2015), pp. 374-377.

* cited by examiner

FIG. 3
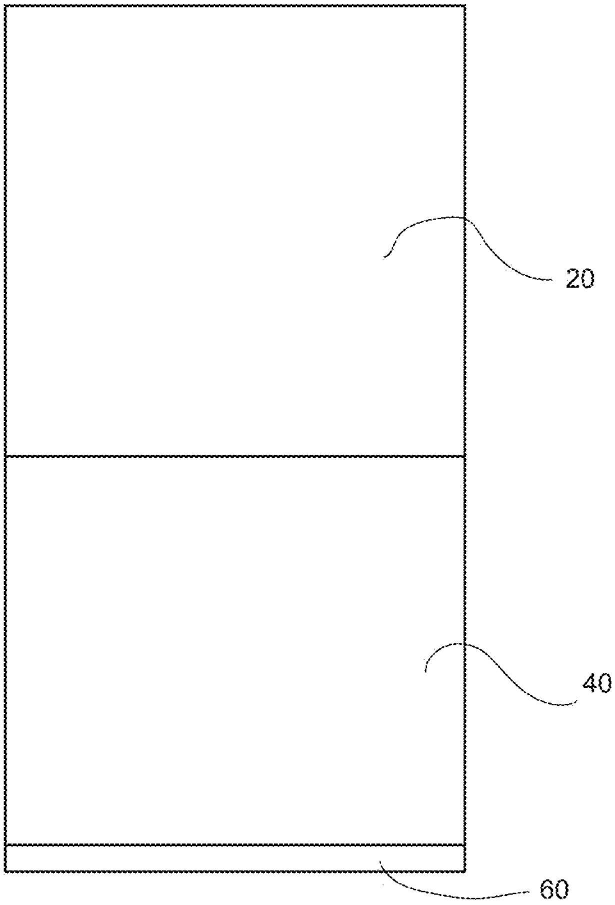
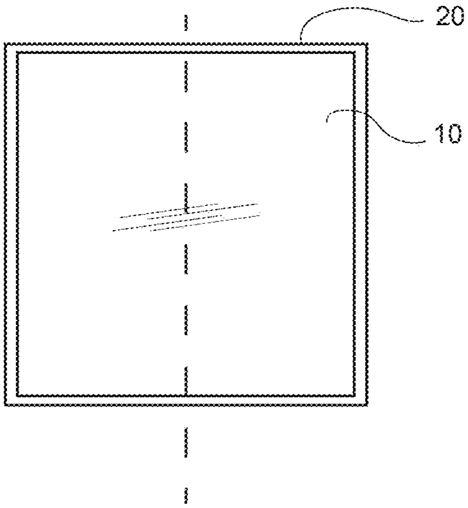
FIG. 4

SYSTEM FOR CONVERTING IMAGES INTO SOUND SPECTRUM

BACKGROUND OF THE INVENTION

Field of the Invention

The present invention relates to the field of optical devices for the acquisition and analysis of man-made shapes, images, colors, and signs, allowing a synesthetic experience through the association of sounds with the produced graphic elements and applicable in various communicative contexts, e.g., such as in the field of interactive videogames, computer science, neuroscience and neuroimaging, in the medical field for therapy (color therapy and music therapy) and/or neurostimulation through BCI (Brain-Computer Interface), HCI (Human-Computer Interaction) and SSD (Sensory Substitution Device), in visual arts, in social arts, but also usable in the pedagogical field.

Description of the Related Art

The invention substantially consists of a device designed to generate a sound, from an image either chosen or produced by a user through a specific image capturing tool and software for processing it and associating the sound; the invention is usable in various contexts ranging from recreational to artistic or even educational.

Devices such as overhead projectors on which it is possible to project previously prepared images, such as photographs or the like, and slides written either beforehand or at the moment, are currently known.

Image projection devices are also known, which work both by means of slides, obviously prepared beforehand, and by acquiring images from digital media and in digital format.

In any case, these known devices allow only the projection of the image which is acquired by the device, and the graphic processing of the image is possible only by using the overhead projectors.

None of the devices listed above also allows associating a specific sound with the projected graphic element.

SUMMARY OF THE INVENTION

The present invention allows generating/associating a specific sound with any graphic element, said graphic element possibly being a line, a shape, a photograph, or simply a color.

Furthermore, the invention also allows the association of specific sounds with graphic elements generated at the moment, as a function of the space occupied by the latter and the time taken to generate them (DRAWING).

According to the invention, such a sound association/creation is achieved by using a hardware medium in combination with dedicated software capable of:

- acquiring the graphic element placed on the hardware platform; and
- at the same time associating/generating a sound with the acquired image.

This allows the user to interact and compose coherently through the space/time of the visible matter (visible spectrum of the drawing) and the space/time of the audible matter (sound spectrum of the waveform), in order to control directly the modulation of sound frequencies (additive sound synthesis) from the color through the drawing (additive RGB mixing), thus generating sound at every variation in space and time.

A better understanding of the invention will be achieved by means of the following detailed description and with reference to the accompanying drawings, which show a preferred embodiment by way of non-limiting example.

BRIEF DESCRIPTION OF THE DRAWINGS

In the drawings:

FIG. 3 is a front view of the invention.

FIG. 4 is a top view of the invention.

DESCRIPTION OF THE PREFERRED EMBODIMENTS

Figure 1:
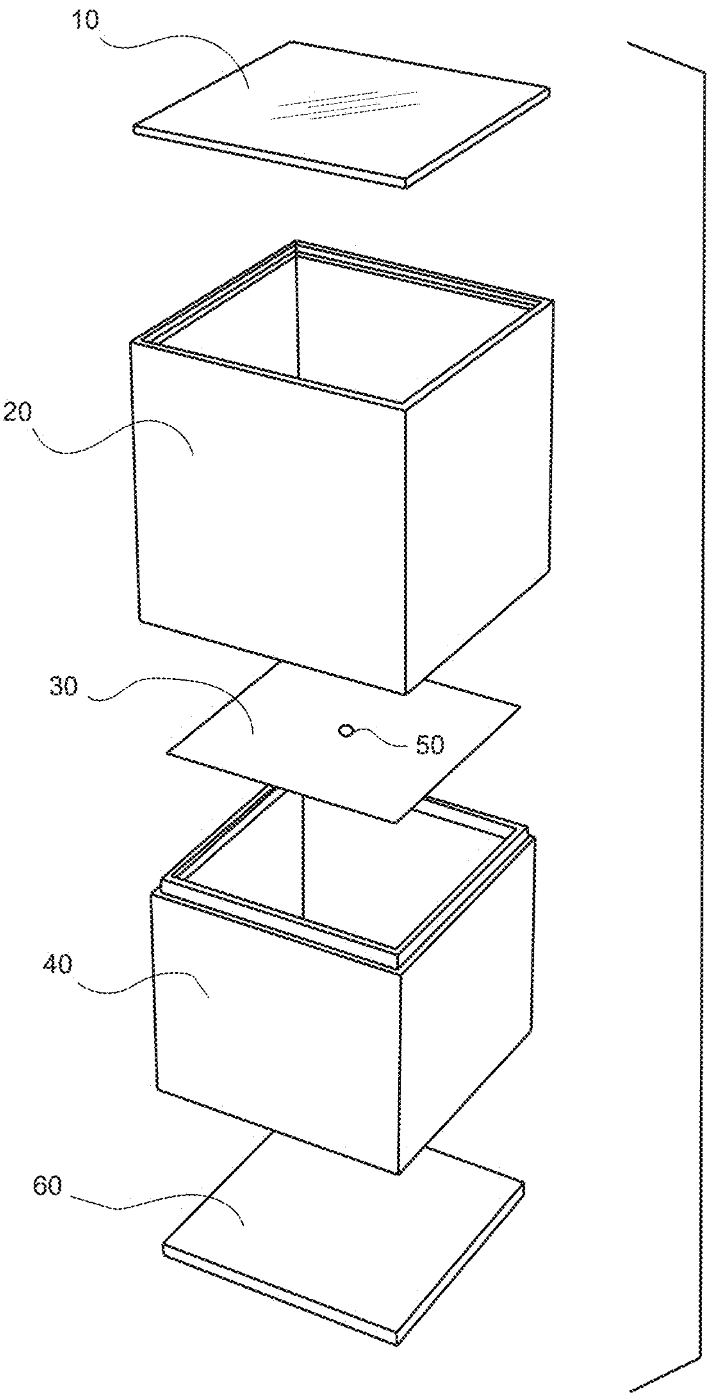
FIG. 1 is a perspective exploded view of the hardware module.
Figure 2:
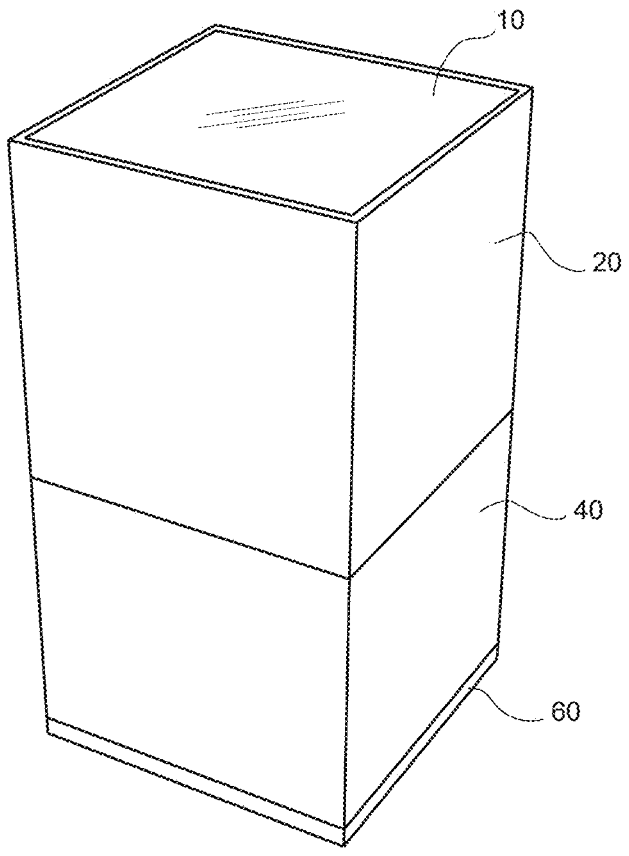
FIG. 2 is a perspective view of the acquisition module.
Figure 5:
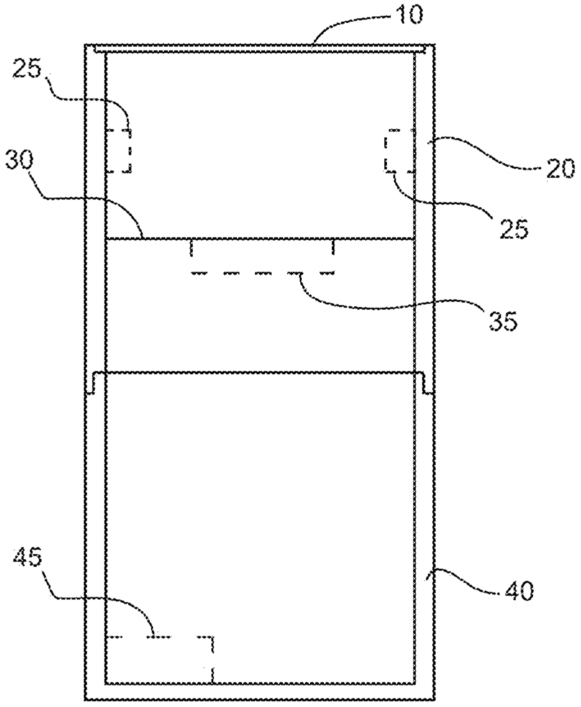
FIG. 5 shows a front sectional view of the invention in which the working surface and the perforated surface are visible.

With reference to the figures listed above, the present invention comprises a hardware device which allows performing the analog image insertion operations and in which a system for acquiring the produced images is provided; the latter works in combination with a software component which allows the images to be acquired, processed, and encoded appropriately and finally converted from analog (original form) to digital as an acoustic spectrum.

Hardware

The hardware device substantially consists of an external module which, in a preferred but non-limiting embodiment, is shaped as a parallelepiped with a square base.

Said module is internally divided into two different superimposed parts 20, 40 and separated by a panel 30 parallel to the bases which defines two superimposed compartments and which is provided with a hole 50 in which the video acquisition device is housed, preferably consisting of a camera 35 oriented towards the upper base 10.

The upper base 10 consists of a transparent material plate and serves the function of working and measuring space.

This transparent plate, which forms the working surface, is preferably made of high-clarity glass with a single-layer, anti-reflective treatment applied to the part of the plate facing the inside of the module, i.e., towards the camera or other image acquisition device.

Said glass plate is made to maximize light transmission by eliminating the undesired reflections and refractions while maintaining the correct chromatic characteristics of the light passing therethrough.

The upper part 20 between the glass plate 10 and the surface containing the imaging device is internally provided with laterally arranged lighting means 25.

In a preferred but non-limiting embodiment, the lighting means comprise LEDs and opaque glass, more specifically the invention provides at least two LEDs arranged on two opposite side surfaces of the upper part of the module and housed inside light units embedded in the supporting structure of the module; advantageously, the LEDs are equipped with white opal diffuser glass.

The lower part, between the surface containing the image acquisition device and the lower base 60 of the module, is entirely covered with a material adapted to absorb light and which allows avoiding the diffusion and refraction of undesired lights and reflections inside the module; this lower part substantially consists of a technical compartment to allow possible maintenance actions or adjustments of the sensor, as well as to obtain a sufficiently high module to operate without needing support surfaces for the structure.

It is worth noting that it is also possible not to provide said technical compartment underneath, e.g., by constraining the sensor directly to the bottom of the top.

According to the invention all the surfaces of the top are also coated with the light-absorbing material, except for the transparent plate and the lighting means.

In a preferred but non-limiting embodiment, said light-absorbing material is preferably black velvet.

The lighting means are such as to ensure a correct illumination of the working space, as well as a homogeneous diffusion of the light in the upper part of the module which ensures uniformity of illumination without shadows or reflections with respect to the lens of the acquisition device, so as not to create areas which are too bright or too in shade and distort the image acquisition.

According to the invention, the image acquisition device is a camera, which consists of a USB module with a CMOS sensor and an interchangeable lens.

The choice of the sensor is mainly related to the number of pixels that the software can use for the acquisition; the increase in the pixel management capacity of the software may be followed by a different choice of acquisition device oriented towards devices having a higher resolution because there is no resolution-sensitivity-dimension constraint related to the device which is described.

According to the invention, the acquisition device will be able to work both in RGB (color) mode and in grayscale (monochrome) mode; for this purpose, the device can be chosen from a monochrome and a color sensor, with the possibility to interchange them.

In addition to maintaining an ideal viewing angle, the lens configuration is determined by the need to "isolate" the two-dimensional working surface, through the depth-of-field effect (normally given by the lenses), so as to focus only on that surface and exclude everything which is beyond the working surface, through a progressive blurring (physiological to all optical systems with lenses, which is created by gradually moving away from the focus point, which here is the outer surface of the glass plate); this separation effect between the two-dimensional surface and everything which is beyond the surface is conceived as an aid to the acquisition software which is facilitated in distinguishing between what is placed/created/traced on the working surface and everything which is beyond, in the surrounding environment and in front of the glass itself (operator, ambient light, etc.); this aid for the software in selecting the figures by selecting the focus of the surface maximizes the system accuracy, thus ensuring that the sound conversion of the images is as concentrated as possible on the images/shapes created/placed on the surface rather than those present beyond.

In a preferred but non-limiting embodiment, the sensor selected is a Sony IMX322 sensor (1/2.9 inch diagonal size, 2.07 Mpx, HD 1920p) and was chosen after careful analysis and is a good compromise between sensor size, shooting fluidity, image quality, light sensitivity, dynamic range, cost, and availability.

In the (non-limiting) constructional example described, the shooting optics consist of a lens for 1/2.7 inch format sensors with varying focal length of F 2.8-12, focal ratio f 1.4, manual focus, and CS thread mount dedicated to CCTV cameras.

The arrangement of the camera, i.e., of the image acquisition device, was established by calculating a field angle between 40° and 55° to simulate a viewing angle similar to that of the human eye, and decrease the natural geometric distortions caused by the shooting optics.

Advantageously, this choice contributes to the correct selection and calibration of the focus plane of the optics on the two-dimensional working area represented by the transparent plate.

Furthermore, an integrated electronic board equipped with local cooling means for the sensor/processor system is provided, preferably of the Peltier cell type with 12V power supply and RMS power of 60 W, also provided with an axial fan powered at 12V and integrated aluminum heat sink, required for the disposal of the heat generated by the continuous and prolonged operation of the CMOS sensor inside the module.

Advantageously, the cooling system limits the signal degradation due to heat development, thus limiting the "dark noise" effect, i.e., the so-called "thermal noise."

As mentioned, in the example shown, the surface containing the camera is arranged parallel to the two upper and lower bases and at a distance from the transparent plate such as to ensure a correct shooting angle, e.g. 80 cm.

In the preferred, non-limiting embodiment described hereto, the hardware is substantially a parallelepiped of a height of about 110 cm and a square base; the glass plate used as the upper base and working surface has a size of 50×50 cm and a thickness of 1.5 cm; the surface containing the acquisition device is advantageously placed at a distance of about 80 cm from the glass plate placed on the upper base.

Software

As mentioned, the hardware component works in combination with a software component 45 the purpose of which substantially is to convert the light spectrum into the acoustic spectrum.

Such a linear conversion allows the user to modulate and control the additive synthesis of waveforms produced over time (sound) through their own actions to move/draw images on the acquisition surface (space) during a given time interval (time). The ultimate goal is to allow full control of the synthetic modulation of sounds (WAVEFORMS) as a function of the images moved or drawn by the user.

In the described example, the software in hand was developed as a patch, or extension, of a commercially known program such as MAX MSP by Cycling'74.

Max is a graphical development environment for music and multimedia designed and updated by the software company Cycling '74, based in San Francisco, California, and has been used for over fifteen years by composers, performers, software designers, researchers, and artists interested in creating interactive software.

An API allows third parties to develop new routines (referred to as external objects). As a result, Max has a large user base of programmers—not related to Cycling '74—who enhance the software with (commercial and non-commercial) extensions to the program.

Precisely by virtue of its extensible design and graphical interface, Max is commonly considered a sort of lingua franca for the software development related to interactive music.

The processed patch detects the RGB values of the video and converts them into audio frequencies; therefore, each frequency will have its own intensity and duration derived from the saturation and brightness, respectively.

The operation of the patch is as follows: only the controls available to the operator are displayed on the patch start page, or presentation mode, these are:

A drop-down menu, which allows selecting the camera to be used, i.e., the webcam installed in the hardware or that built into the computer;

A switch, which allows starting the data communication between the camera and the patch with a frame rate expressed in milliseconds and adjustable in the object to the right of the switch;

An offset adjustment panel, which allows adjusting, within the video matrix, the pixel from which to start the list of RGB values; said list can comprise from a minimum of 1 to a maximum of 30 pixels and the size of the list is adjustable with a special panel;

A "fader" bar for adjusting the audio output volume and turning the audio engine on or off;

A panel for saving settings and for creating and switching between saved settings.

According to the invention, the patch is configured to map the working area and allow a coherent generation/transformation (input-output) of sinusoidal waveforms over time (sound) through the acquisition of images moved or drawn by the user in the working space (drawing); the video image is processed within an RGB matrix with a size, e.g., 640*480 pixels compatibly with the performance of the software that, in the version used, does not support the number of calculations required for the processing of higher resolutions.

Each pixel in this matrix is defined by three values which are related to the saturation of the red (R), green (G), and blue (B) values; each of these values is in a range from 0 to 255.

The matrix of RGB values from the workspace used by the user is converted by the program as a frequency matrix: the three RGB values of each individual pixel are added over time, and their sum value (additive mixture of the RGB values used over time) is converted into a sound frequency value (additive synthesis of the sound frequency values from the space occupied by the images) which lies in a range from 64 to 8000 Hz, according to a relationship which could be defined as one of substantially direct proportionality such that, for example, as the sum of RGB values increases, the frequency of the corresponding sound will approach the upper end of the frequency range, thus allowing the user to perform a sound modulation in real-time (additive synthesis of sounds over time) through the neuromotor activity related to drawing and images moved/drawn on the surface (additive mixing of colors in space).

In other words, each user-generated image variation in SPACE and TIME (i.e., in the time it took to make that variation), corresponds to a degree of additive mixing of RGB values in space, which is directly proportional to a degree of additive synthesis of sounds over time. Such a percentage ratio is closely related to the values of the HSL array, space, and time, and allows the user to modulate the sinusoidal waveforms through his/her actions on the images (pixels and RGB values). Said sum of RGB values corresponds to the additive mixture of color frequencies used by the user in the image space in a given time interval, and is directly related (or proportional) to the additive synthesis of sounds generated over time as a result of the actions by the user himself/herself.

The RGB matrix, obtained for all the acquired image, is converted utilizing commercial programs into a new matrix with HSL values (opacity, saturation, and brightness) of 640*480 pixels in size. Where these HSL values, which are related to the space and time corresponding to image variations, allow the user to use the visible spectrum of RGB values to modulate the sound spectrum of frequency values.

Again in this case, the software component extracts two lists of values, related to both brightness and saturation, between 0 and 255 for each pixel of the matrix.

According to the invention, the brightness value is interpreted and converted by the software component as a sound duration value, while the saturation value corresponds to the sound intensity and is thus dependent on the amount of color (RGB) detected by the camera.

It is known that the parameters which define a sound are frequency, intensity, and duration; thus all the values identified by the software component allow associating, with each detected pixel, a frequency (sum of R, G, and B values converted into the auditory frequency range), an intensity (corresponding to the saturation value from the HSL array), and a duration (corresponding to the brightness value from the HSL array), and therefore a sound.

In this respect, it is worth noting that, according to a specific feature of the invention, the particular choice of the aforesaid parameters to generate a sound, from the image acquired from the transparent flat surface of said hardware component (Visible Spectrum=>Sound Spectrum), is innovative and original in that it allows taking into account the SPACE (which determines the output sound intensity) occupied by the image moved or drawn by the user and the TIME (which determines the output sound duration) taken by the user to draw that image on the transparent surface of the hardware component.

Operation

According to the invention, the camera sensor 35 acquires the image by either placing or translating an image on the glass plate or even drawing it directly thereon.

Through the software component 45 it is possible to manage, as mentioned, the data transmission from the hardware component, which data are received by the software component itself, which elaborates them attributing some RGB color "quantity" values to each identified pixel, which values form the frequency of the sound to be associated.

This RGB matrix is converted into an HSL array the saturation and brightness values of which define the intensity and duration of the sound, respectively.

The three values of frequency, intensity, and duration thus obtained uniquely define a sound related to a specific pixel.

It is worth noting that each sign drawn and/or each image placed on the plate corresponds to a specific sound because the matrix is processed in real-time, so even a "movement" of the image from one point to another of the glass plate will result in a variation in the parameters mentioned above and a consequent sound variation.

A variant of the invention (not shown) provides for the additional use of a neuroimaging apparatus, e.g., of the type comprising a helmet which is wearable by a user/subject to detect brain activity while drawing, where said apparatus generates images of the subject's brain activity in real time, and where said images are used, in addition to those drawn on the transparent surface of the hardware component, to generate an overall sound given by the sum of the sounds generated from the drawn images and the sounds generated from the images of the corresponding brain activity.

Thereby, the overall sound, generated by this variant of the invention, would take into account not only the image drawn by the user but also the effect on his/her brain (through the image of his/her brain activity) while:

it is stimulated by the vision of what is being drawn;

it is stimulated by the movements made to draw;

it is stimulated by the sounds heard and generated through the invention.

The overall sound thus depends not only on the drawn image but also on the stimuli of the subject drawing it, while it is being drawn.

The invention claimed is:

1. A system for real-time acquisition, analysis, and conversion of visual spectrum of shapes, images, colors, and signs into sound spectrum, the system comprising a hardware component for analog optical acquisition of images either moved or drawn on a transparent flat surface of said hardware component, and a software component for processing the acquired images and converting a visual spectrum thereof into sound spectrum;

wherein the hardware component comprises a chamber, an upper base of which consists essentially of a transparent material plate, comprising said transparent flat surface, and on a lower base of which an image acquisition device is accommodated, facing the transparent material plate and configured to frame the transparent material plate completely; wherein side walls of the chamber are provided with lighting means configured to ensure a correct illumination of an inner surface of the transparent material plate which forms a working space, as well as a homogeneous diffusion of light in an upper part of the chamber which ensures uniformity of illumination without shadows or reflections with respect to a lens of the image acquisition device, so as not to create areas which are too bright or too shaded and distort image acquisition;

and wherein the software component is configured to detect every RGB value of each pixel acquired by the image acquisition device, and process and convert values detected in order to associate, with each acquired pixel, three values consisting of, respectively:

a sound frequency value, given by a sum of RGB values converted into an auditory frequency range;

a sound intensity value, corresponding to a saturation value from an HSL array, wherein said saturation value, and thus said sound intensity value, is correlated to a space occupied by said images either moved or drawn on the transparent flat surface of the hardware component;

a sound duration value, corresponding to a brightness value from the HSL array, wherein said brightness value, and thus said sound duration value, is correlated to a took to draw move or said images on the time it transparent material plate of the hardware component;

wherein said three values correspond to a specific sound associated with a specific acquired pixel.

2. The system according to claim 1, further comprising at least two opposite lighting means.

3. The system of claim 2, wherein all inner surfaces of the chamber, except for the transparent material plate and the lighting means, are coated with a light-absorbing material which allows avoiding diffusion and refraction of unwanted light and reflections inside the hardware component.

4. The system according to claim 1, wherein all inner surfaces of the chamber, except for the transparent material plate and the lighting means, are coated with a light-absorbing material which allows avoiding diffusion and refraction of unwanted light and reflections inside the hardware component.

5. The system according to claim 4, wherein the light-absorbing material is an adhesive black velvet coating.

6. The system according to claim 1, wherein said image acquisition device is configured to transmit images to said dedicated software component, adapted to carry out the conversion from the visual spectrum to the audio spectrum.

7. The system according to claim 6, wherein said image acquisition device is interchangeable, being selectable between color or monochrome devices and with different pixel resolutions.

8. The system according to claim 1, wherein said image acquisition device is interchangeable, being selectable between color or monochrome devices and with different pixel resolutions.

9. The system according to claim 1, wherein said image acquisition device is provided with a lens whose configuration isolates a two-dimensional working surface of the transparent material plate, through a depth-of-field effect, so as to have only an outer surface of the transparent material plate in focus, and excluding everything beyond the outer surface through a progressive optical blur.

10. The system according to claim 9, wherein an arrangement of the image acquisition device is established by calculating a field angle between 40° and 55° so as to simulate a view angle which is similar to that of a human eye and reduce natural geometric distortions caused by shooting optics, thus contributing to correct selection and calibration of a focus plane of the shooting optics on a two-dimensional working area represented by the transparent material plate.

11. The system according to claim 1, wherein said software component consists essentially of a patch which acts on a commercial program.

12. The system according to claim 1, further comprising a neuroimaging generation apparatus, configured to:

acquire data related to brain activity of a user who is moving or drawing said images on the transparent flat surface of said hardware component in real-time, and generate a corresponding image of said brain activity in real-time;

wherein said software component is configured to also process said image of brain activity and generate a sound which is addable to that which is generated by processing of images acquired by said image acquisition device.

13. A method for real-time acquisition, analysis, and conversion of a visual spectrum of shapes, images, colors and signs into sound spectrum, the method comprising using a system comprising at least one hardware module, comprising image acquisition means, and a software module, wherein said modules are functionally connected to acquire a visual spectrum of images and process a visual spectrum to convert the visual spectrum into a sound spectrum according to the following steps:

acquiring an image which is moved or drawn on a working surface by the image acquisition means by means of an optical device with detection of pixels of said image;

processing acquired image pixels by the software module to detect each RGB value of each acquired image pixel;

processing and converting detected RGB values into HSL values in order to associate, with each acquired image pixel, three values consisting of, respectively: a sound frequency value, given by a sum of the RGB values converted into an auditory frequency range; a sound intensity value, corresponding to a saturation value from an HSL array, and a sound duration value, corresponding to a brightness value from the HSL array, wherein:

said saturation value, and thus said sound intensity value, is correlated to a space occupied by said images either moved or drawn on a flat transparent surface of the hardware module; and said brightness value, and thus said sound duration value, is correlated to a time it took to move or draw said images on the flat transparent surface of the hardware module.

* * * * *